No. 723,000. PATENTED MAR. 17, 1903.
M. W. MARSDEN.
AIR COMPRESSOR.
APPLICATION FILED AUG. 8, 1901.
NO MODEL. 3 SHEETS—SHEET 1.

No. 723,000.　　　　　　　　　　　　PATENTED MAR. 17, 1903.
M. W. MARSDEN.
AIR COMPRESSOR.
APPLICATION FILED AUG. 8, 1901.

NO MODEL.　　　　　　　　　　　　　　3 SHEETS—SHEET 3.

UNITED STATES PATENT OFFICE.

MARK W. MARSDEN, OF PHILADELPHIA, PENNSYLVANIA, ASSIGNOR TO FRANK S. COBB, OF CLEVELAND, OHIO.

AIR-COMPRESSOR.

SPECIFICATION forming part of Letters Patent No. 723,000, dated March 17, 1903.

Application filed August 8, 1901. Serial No. 71,336. (No model.)

*To all whom it may concern:*

Be it known that I, MARK W. MARSDEN, a citizen of the United States, residing at Philadelphia, in the county of Philadelphia and State of Pennsylvania, have invented a certain new and useful Air-Compressor, of which the following is a specification.

It is one object of the present invention to provide a machine which shall be very efficient in transforming power applied to it into compressed air.

Another object of the invention is to make the machine compact, reliable, and so constructed that the leverage of the parts which compress the air is largely in favor of the economy of power.

Another object of the invention is to provide an efficient, reliable, durable, and economic pump.

To these and other ends hereinafter set forth the invention, stated in general terms, comprises a series of individually hinged or movable vanes, to which there is imparted as a whole a movement through a chamber while opening and closing, so that the vanes feed inward into a suitable chamber, provision being made, as by means of check-valves, for insuring the described feed and operation.

The invention further comprises the improvements hereinafter described and claimed.

The nature, characteristic features, and scope of the invention will be more fully understood from the following description, taken in connection with the accompanying drawings, forming part hereof, and in which—

Figure 1:
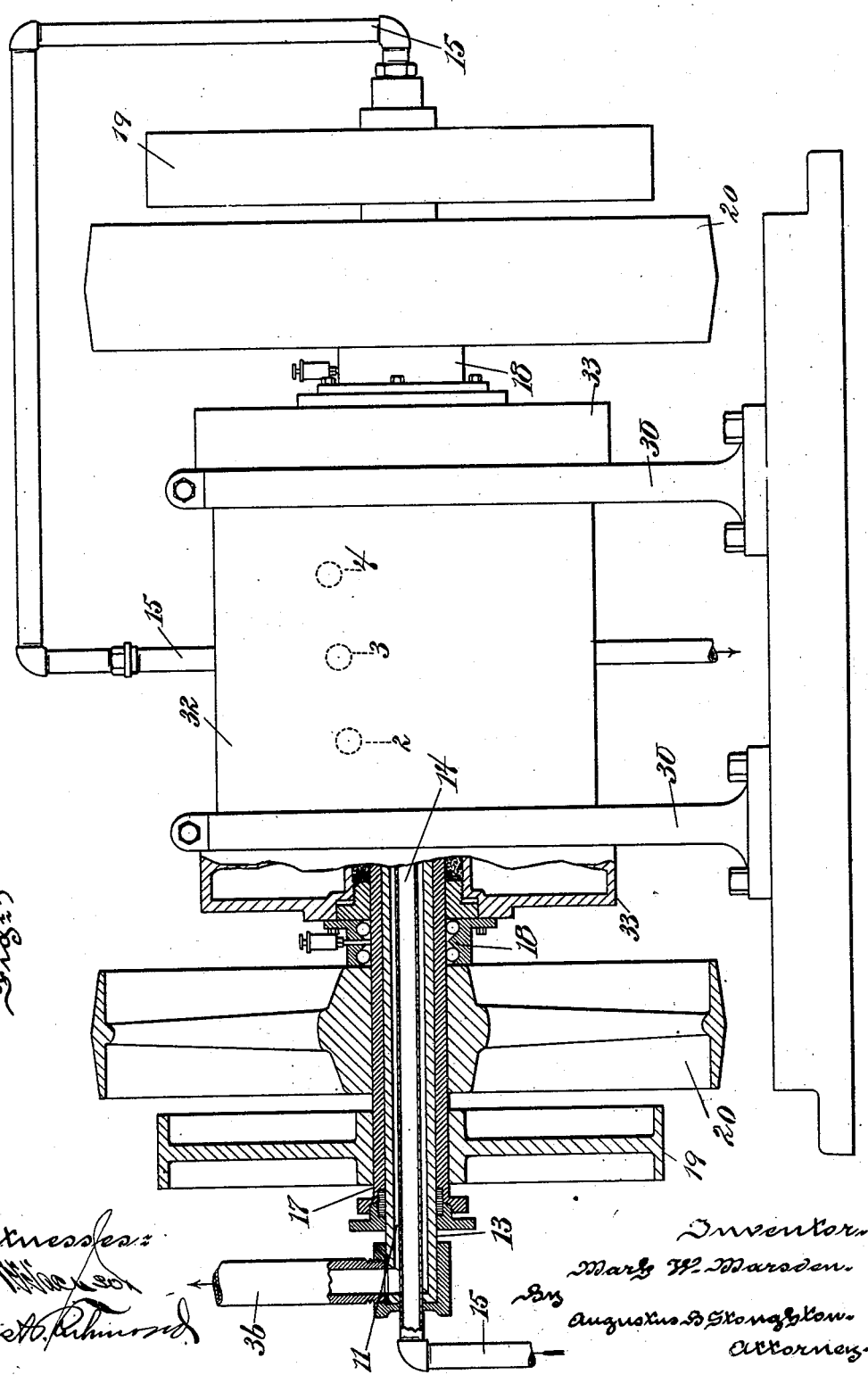
Figure 2:
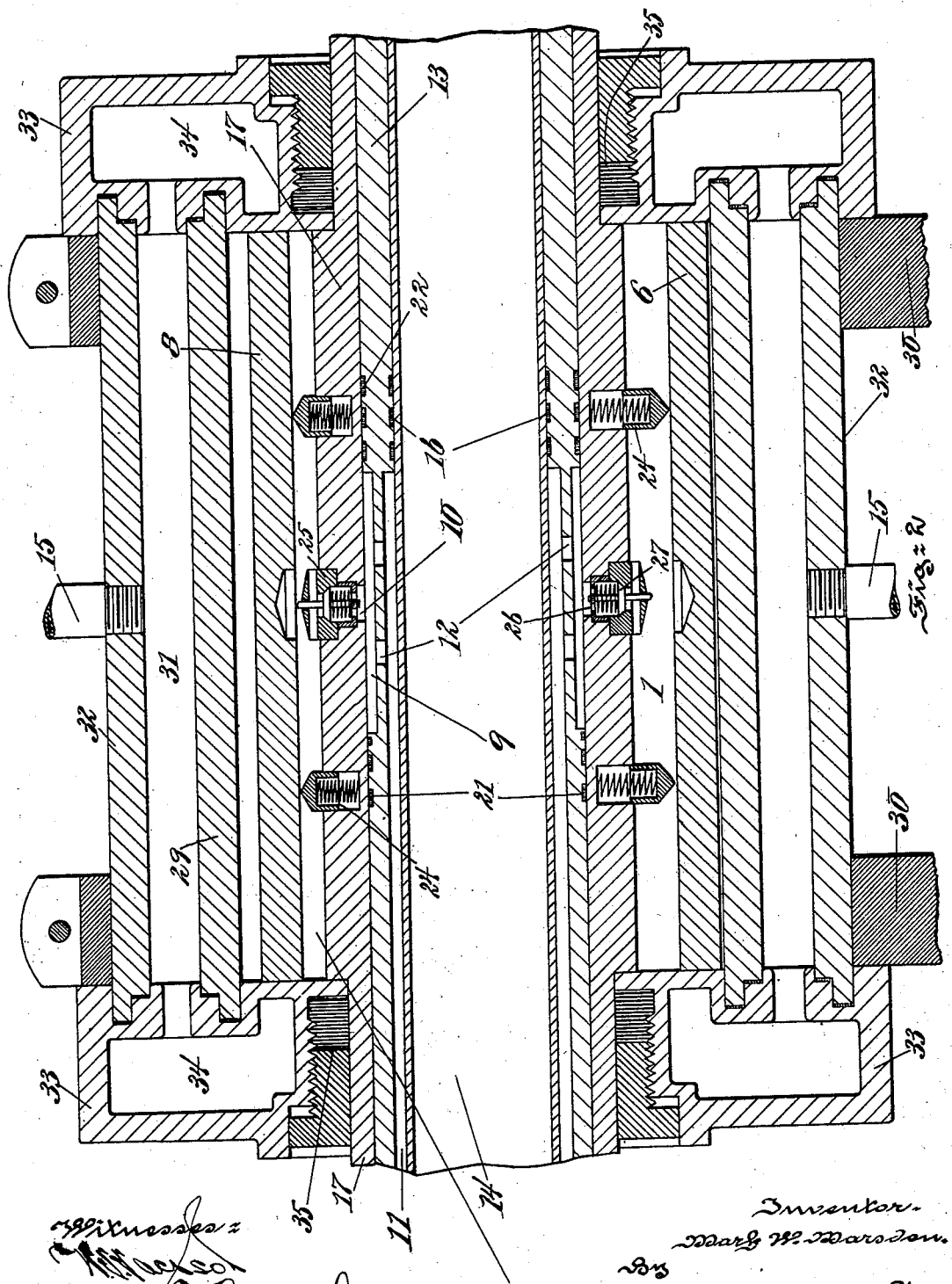
Figure 3:
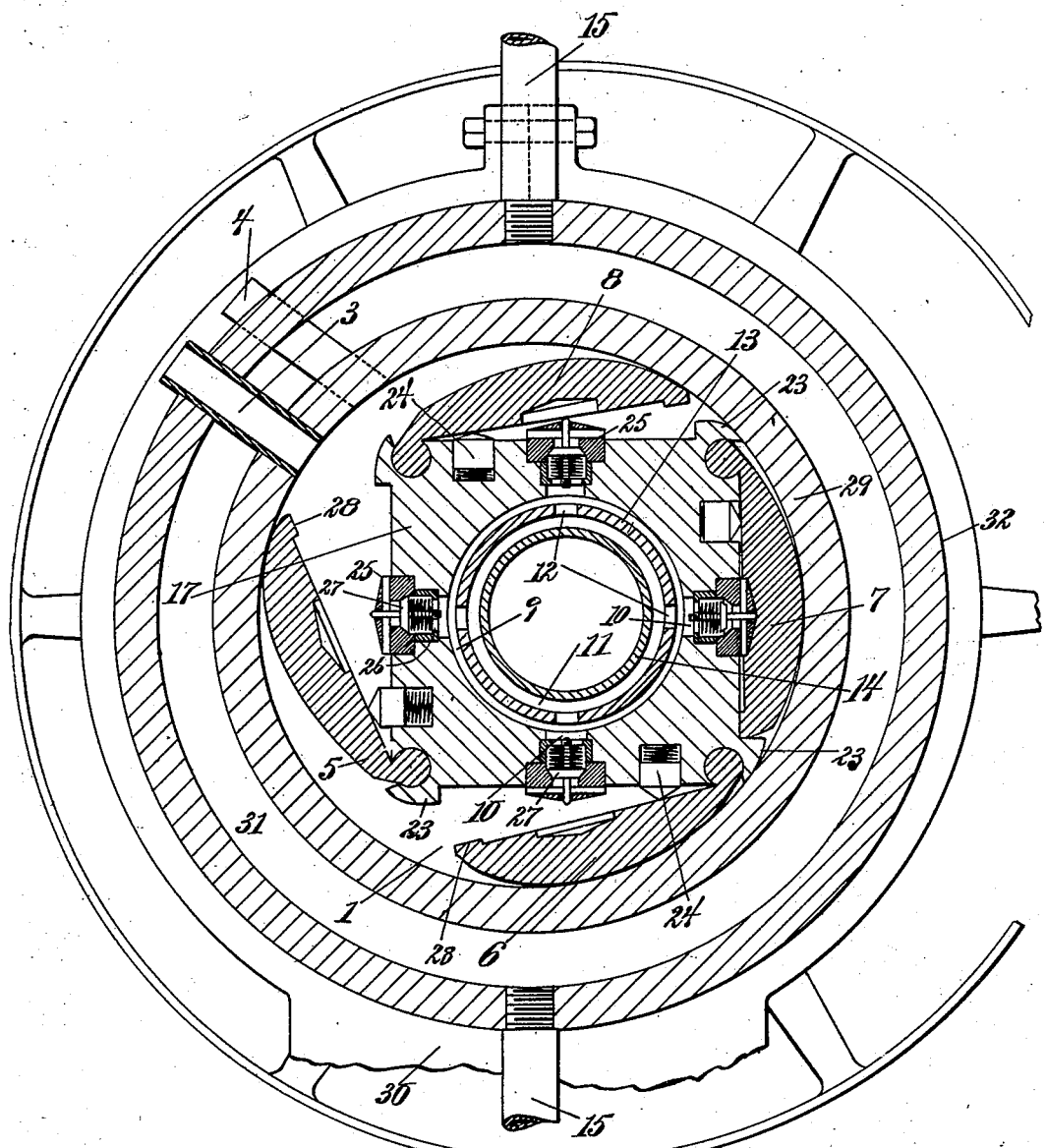

Figure 1 is a front view, partly in section, of a machine embodying features of the invention. Fig. 2 is a longitudinal central section of the machine shown in Fig. 1, drawn to an enlarged scale. Fig. 3 is a transverse sectional view taken through the center of Fig. 2.

In the embodiment of my invention illustrated in the drawings, 1 is a chamber which when air is being operated upon contains a supply of air. This chamber 1 is cylindrical and is closed at its ends and is provided with inlets, of which three (2, 3, and 4) are shown, although the number and shape of the air-inlets may be increased, decreased, or changed.

As shown, Fig. 1, the air-inlets are arranged obliquely, the object being to have the wall of the chamber 1 smooth and free from obstructions, so that the wings or vanes 5, 6, 7, and 8 can travel freely and without shocks, jars, or undue wear.

9 is a chamber which in the case of the compression of air constitutes a receiving-chamber.

The wings or vanes, of which four are shown in the drawings, but of which the number may be increased or diminished, move as a whole or as a series through or around the chamber 1, and while moving they are opened and closed, and in doing this they in the case of air compress it and feed it inward to the chamber 9 through suitable valved openings, as 10, of which there is one shown for each vane, although there may of course be more than one. From the chamber 9 there are means which communicate with the exterior of the machine—for example, the passage 11, which communicates with the chamber 9 by way of the openings 12. For the sake of further explanation the machine shown in the drawings comprises a hollow shaft 13, which is not constructed to rotate. This hollow shaft is turned down on its outside and approximately at its center to constitute, together with the carrier 17, the chamber 9, and the openings 12 are made in this turned-down portion. Internally this hollow shaft 13 is shown as bored out at one end to constitute the passage 11; but of course the passage 11 may be made to extend toward both ends of the hollow shaft. Within the hollow shaft 13 there is shown a pipe 14, which serves to convey water or other cooling medium, if required. As shown, the pipe 14 is fitted with connections 15, Fig. 1, for permitting of a circulation of water through it.

16 indicates packing between the parts 13 and 14. Fitted for rotation in respect to the hollow shaft 13 is a carrier 17. The latter may extend, as shown, clear through the machine and be supported by bearings 18, and the ends of the carrier 17 may be fitted with one or more pulleys and fly-wheels, as 19 and 20. Between the carrier and the periphery of the part 13 and on opposite ends of the chamber 9 there are shown ring-packings 21 and 22. The center portion of the carrier 17 is shown as generally square, Fig. 3, while its ends are tubular, as has been described. At the corners of the square portion of the carrier there are projections 23, which are on their outside of the form of parts of a circle and which are rectangular on one side and undercut on the other side adjacent to the groove which constitutes or may constitute one member of the hinge-joint, the other member of which is formed on the vanes. The vanes are thus pivoted to the carrier and when they are shut down close against it their outer faces, as well as the corners 23, lie in substantially the arc of a circle. The undercut portions of the corners afford clearance, so that the vanes may be free to open. The carrier 17 is also shown as fitted with spring members 24, which when present operate to tend to open the wings or vanes. As shown, the parts 10 comprise openings cut through the carrier and fitted with spiders 25 and 26, of which the spider 25 is equipped with a valve-seat. Operatively arranged in respect to the opening and valve-seat are check-valves 27. These are illustrated as equipped with springs which tend to hold them against their seats, and their valve-spindles project slightly outward from the carrier. The vanes are constructed to collide with these valve-spindles, and for this purpose they are shown as slightly countersunk on their inner faces, so as to accommodate the spiders 25. On the inner faces and at the edges opposite their points of pivotal support the vanes are provided with lips 28, as shown.

29 is a cylindrical casing which incloses the chamber 1. Its ends are closed, and it is shown as held by standards 30 in such a way that it may not rotate. Encircling the casing there is a water-jacket 31, which is inclosed by a shell 32. The ends or heads 33 are shown as fitted with suitable spaces 34, which also constitute water-jackets, and between the ends or heads 33 and the part 17 there are packings 35. The casing 29 is arranged with its axis eccentric in respect to the axis of revolution of the carrier 17, as shown in Fig. 3, and this arrangement affords means for closing the vanes or wings down onto the carrier 17. The water connections 15 are shown to lead through the pipe 14 to the water-jacket 31, to the end jackets 34, back to the jacket 31, and thence from the machine. The passage 11, which has been described, is shown as connected at the left-hand end of the machine with the pipe 36, which leads air from the machine. For the sake of clearness of explanation I will proceed to describe the operation of the machine in connection with the compression of air.

In the operation of the compressor the vanes or pistons are caused to close by their rotation with the carrier within the cylindrical casing, this being due to the eccentric relation between said carrier and cylindrical casing. The vanes or pistons are caused to open partially by the expansive force of the small amount of compressed fluid underneath them and partially by the outward pressure of the spring members 24.

Power is applied to the part 17, for example, by way of the pulley 19, so that the part 17 is rotated and at the same time water is caused to circulate through the various jackets in order to assist in keeping the apparatus cool. The rotation of the part 17, in reference to Fig. 3, is in a clockwise direction, and atmospheric air enters by way of the inlets 2, 3, and 4. Referring to Fig. 3, the vane 5 takes up under it a supply of air, and as the carrier rotates the vane 5, sliding upon the inner face of the casing 29, is gradually closed down onto the carrier, thus acting as a piston or plunger. The air is compressed under it, and in traveling as described the vane or piston finally is partially closed, for instance, so that it gets into the position shown by the vane 8, and the continued movement of the carrier brings it into the position shown by the vane 7 in Fig. 3. In closing it is possible for the air which is compressed under the vane and between it and the carrier to open the check-valve whenever the pressure under the vane or piston exceeds that within the chamber 9 to a degree sufficient to overcome the force of the check-valve spring and in that way reach the chamber 9, and this may occur at any time intermediate of the travel of the vanes from, for example, the position shown by the vane 5 to nearly the position shown by the vane 7. However, when the vane reaches the position shown by the vane 7 it collides with the stem of the valve and positively opens the valve. The result of this is that the air-pressure in the chamber 9 exerts its influence on the vane and causes it to tightly hug the wall of the casing 29, thus, as it were, insuring a good packing at that point, which, as has been stated, corresponds with the position of the vane 7, Fig. 3. When the valve is open, as has been described, the compressed air is, as it were, trapped by the lip 28 and acts pretty well throughout the under surface of the vane. The fact that the check-valve is pushed open by the vane, as is indicated in the case of the vane 7, not only accomplishes the result described in respect to the packing of the vane by causing it to hug the part 29, but also insures the opening of the vane as soon as it has passed to a portion of the casing 29, where it can open. For example, the vane 6 illustrates in a general way the portion of the casing last mentioned, and in that position the check-valve reseats itself, and thus prevents the escape of compressed air after the vane is well open in position for receiving a fresh supply of air when it passes the air-inlets. It will be observed that air may travel from under the vanes to the chamber 9 whenever its pressure under the vanes exceeds its pressure in the chamber 9, because its pressure will open the check-valves at any position of the vane in its travel, and it will be further observed that when the vane is forced down onto its carrier by reason of the eccentricity of the part 29 in respect to the axis of the carrier the vane will positively open the check-valve, and thus permit the compressed air to accomplish two functions: first, to hold the vane well up to the casing and in that way insure a good packing for the vane which follows it, and, second, to throw the vane open into position for again compressing air. It will further be observed that in compressing air the vanes feed the air inward toward the center and in that way since they run on the inside of an eccentric casing the leverage is in favor of the power which drives the carrier. After the air has entered the chamber 9 it finds its way through the openings 12 to the passage 11, and thence to the pipe 36, from which it may be led off for any useful purpose.

It will be observed that the passage 11 forms practically a central fluid chamber or duct and that each of the wings or vanes constitutes in connection with the inclosing casing a pump. The plurality or series of such pumps are mounted in proximity to the central fluid-duct and radial thereof, and the connections between the pump-chambers and the wings or vanes to or with the said duct are such or afford such a communication that the fluid is forced into the chamber or duct from the several pumps successively or one after another as the said pumps rotate about the said chamber or duct. The connections between the several pumps and the central duct are entirely independent of each other, and owing to the successive operation of the pumps, as stated, the machine may be driven uniformly without shock or jar at any point of its operation.

It will be obvious to those skilled in the art to which the invention relates that modifications may be made in details without departing from the spirit thereof. Hence I do not limit myself to the precise construction and arrangement of parts hereinabove set forth, and illustrated in the accompanying drawings; but,

Having thus described the nature and objects of the invention, what I claim as new, and desire to secure by Letters Patent, is—

1. A machine of the class described comprising a cylindrical casing having inlets and a carrier provided with hinged vanes or wings and arranged within and eccentrically of said casing and one of said parts being rotatable in respect to the other, said carrier having a chamber formed therein, and passages communicating with said chamber and valves in said passages arranged to be operated by the wings, substantially as described.

2. A machine of the class described comprising a cylindrical casing provided with inlets, a shaft fixed in respect to and arranged eccentrically of said casing, a carrier revolubly mounted on said shaft and provided with movable wings or vanes the free ends of which ride on the inner face of the casing, a receiving-chamber formed between said shaft and carrier, passages arranged under the vanes and communicating with said chamber and with the space included by the casing, and check-valves arranged in said passages and adapted to be actuated by the wings, substantially as described.

3. A machine of the class described comprising a cylindrical casing having inlets, a hollow shaft arranged eccentrically of said casing, a carrier rotatably mounted on said hollow shaft and penetrating the heads of the cylindrical casing and of generally polygonal cross-section within the casing, wings or vanes pivotally attached to the corners of the polygonal portion of said carrier, a receiving-chamber formed between said shaft and carrier, openings arranged beneath the vanes and communicating with said chamber, valves in said openings arranged to be actuated by the vanes, means for conducting a cooling medium through said hollow shaft, and an eduction-passage located between said shaft and means, substantially as described.

4. A machine of the class specified, comprising a cylindrical casing provided with inlets, and a carrier of generally polygonal cross-section arranged within and eccentrically of said casing and one of said parts being rotatable in respect to the other, vanes or wings movably connected at or near the corners of the polygonal portion of the carrier, a receiving-chamber formed within the carrier, passages through said carrier for establishing communication with the receiving-chamber, substantially as described, and valves in said passages adapted to be actuated by the vanes.

5. A machine of the class specified, comprising a cylindrical casing provided with inlets and a carrier of generally polygonal cross-section arranged within and eccentrically of said casing and one of said parts being rotatable in respect to the other, vanes or wings movably connected at or near the corners of the polygonal portion of the carrier, a receiving-chamber formed internally of said carrier, openings penetrating the walls of the carrier and communicating with said chamber, valves in said openings arranged to be operated by the vanes, and means for circulating a cooling agent through the machine, substantially as described.

6. A machine of the class specified, comprising a cylindrical casing provided with inlets and a carrier of generally polygonal cross-section arranged within and eccentrically of said casing and one of said parts being rotatable in respect to the other, vanes or wings hinged at or near the corners of the polygonal portion of the carrier, a central hollow shaft, a receiving-chamber formed between said shaft and carrier, openings penetrating the walls of the carrier and communicating with said chamber, valves in said openings arranged to be operated by the vanes, means for conducting a cooling agent through the shaft, and an eduction-passage formed between said shaft and means and communicating with the receiving-chamber, substantially as described.

7. In a machine of the class specified, the combination of a casing provided with inlets and a revoluble carrier arranged within and eccentrically of said casing and having openings and an internal chamber with which said openings communicate, check-valves arranged in said openings, and wings or vanes attached to the carrier and arranged to actuate said valves, substantially as described.

8. In a machine of the class specified, the combination of a revoluble carrier, a chamber within and a chamber around said carrier and said chambers having communication through openings in the carrier, wings or vanes movably connected with the carrier, check-valves arranged in said openings in position to be actuated by the vanes, and means for opening and closing the vanes or wings in respect to the carrier and to the openings in it, substantially as described.

9. In a machine of the class specified, the combination of a central hollow shaft, a pipe innerlying the shaft for conducting a cooling agent therethrough, a revoluble carrier, a chamber formed between the carrier and shaft and a chamber around the carrier and said chambers having communication through openings in the carrier, wings or vanes movably connected with the carrier, check-valves arranged in said openings in position to be actuated by the vanes, and means for opening or closing the vanes or wings in respect to the carrier and to the openings in it, substantially as described.

10. In a machine of the class specified the combination of a stationary hollow shaft, a revoluble carrier of generally polygonal cross-section provided with round corners, a chamber within and a chamber around said carrier and said chambers having communication through the openings in the carrier, check-valves in said openings, wings or vanes pivotally attached near the corners of said carrier and provided with circular backs and with lips on their faces and adapted to operatively engage the check-valves, means for opening and closing the wings, and means for conducting a cooling medium through the hollow shaft, substantially as described.

11. A compressor comprising a water-jacketed casing having air-inlets, a water-cooled stationary hollow shaft arranged eccentrically of and within the casing and provided with an eduction-passage, a carrier rotatable on said shaft and provided with extensions that penetrate the heads of the casing, a chamber formed between said carrier and shaft and communicating with said eduction-passage, openings establishing communication between said chamber and the exterior of the carrier, valves for said openings, and wings or vanes movably attached to the carrier and arranged to actuate the valves, substantially as described.

12. A compressor comprising a casing having inlets, a carrier provided with hinged vanes or wings and arranged within and eccentrically of the said casing and one of said parts being rotatable in respect to the other, a central hollow shaft a receiving-chamber formed between said shaft and carrier, valved passages being formed below the wings for establishing communication between the exterior of the carrier and the chamber and means whereby the compressed medium may be discharged axially of the machine, substantially as described.

13. An air-compressor comprising a casing having inlets, and a carrier provided with hinged vanes or wings and arranged within said casing, one of said parts being rotatable with respect to the other, the carrier being formed with an internal passage for air and ports leading to said passage, valves in said ports adapted to be actuated by the vanes, the internal configuration of the casing being such with respect to the carrier that the relative movement of the parts forces the vanes or wings to move toward said ports and their valves.

14. An air-compressor comprising a casing having inlets, and a carrier provided with hinged vanes or wings and arranged within said casing, one of said parts being rotatable with respect to the other, the carrier being formed with an internal passage for air and ports leading to said passage, valves in said ports adapted to be actuated by the vanes, the internal configuration of the casing being such with respect to the carrier that the relative movement of the parts forces the vanes or wings to move toward said ports and their valves, means being provided for the circulation of water in proximity to the internal passage of said carrier.

In testimony whereof I have hereunto signed my name.

MARK W. MARSDEN.

In presence of—
JAS. A. RICHMOND,
P. L. WOOLDRIDGE.